Jan. 30, 1945. C. C. HAAS 2,368,134
PLANTER
Filed March 31, 1943 5 Sheets-Sheet 4
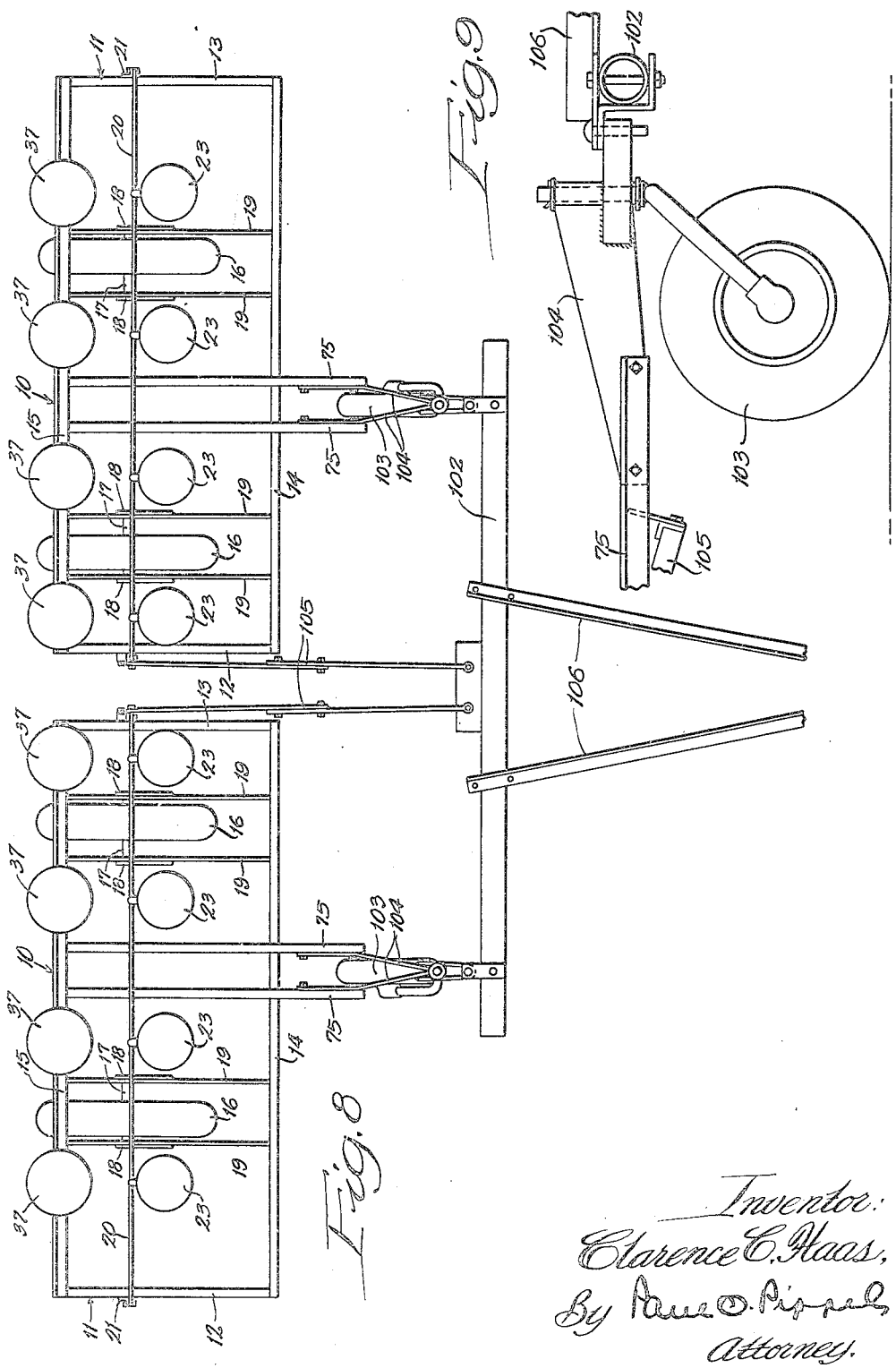
Inventor:
Clarence C. Haas,
By Paul O. Pippel
Attorney.

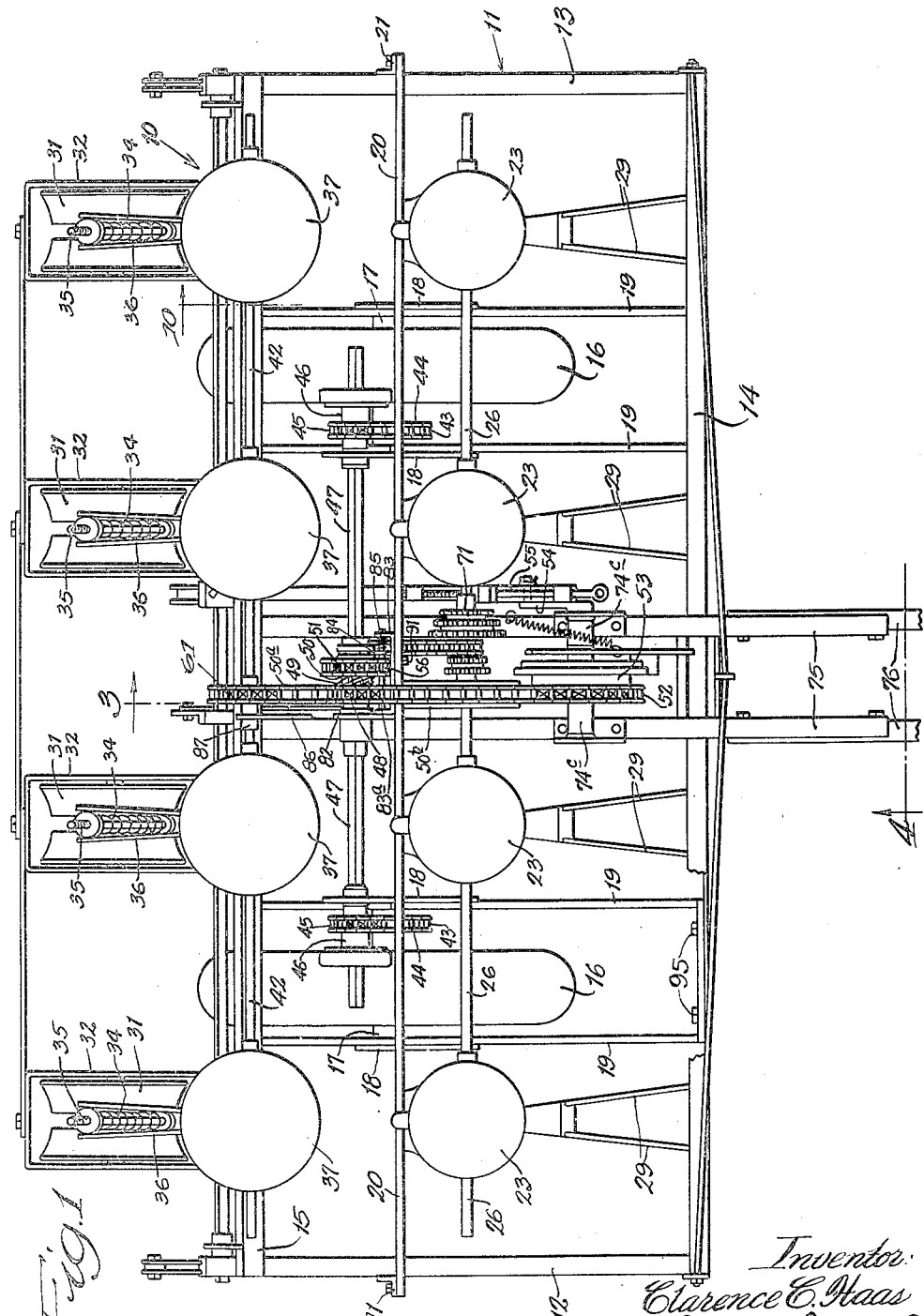

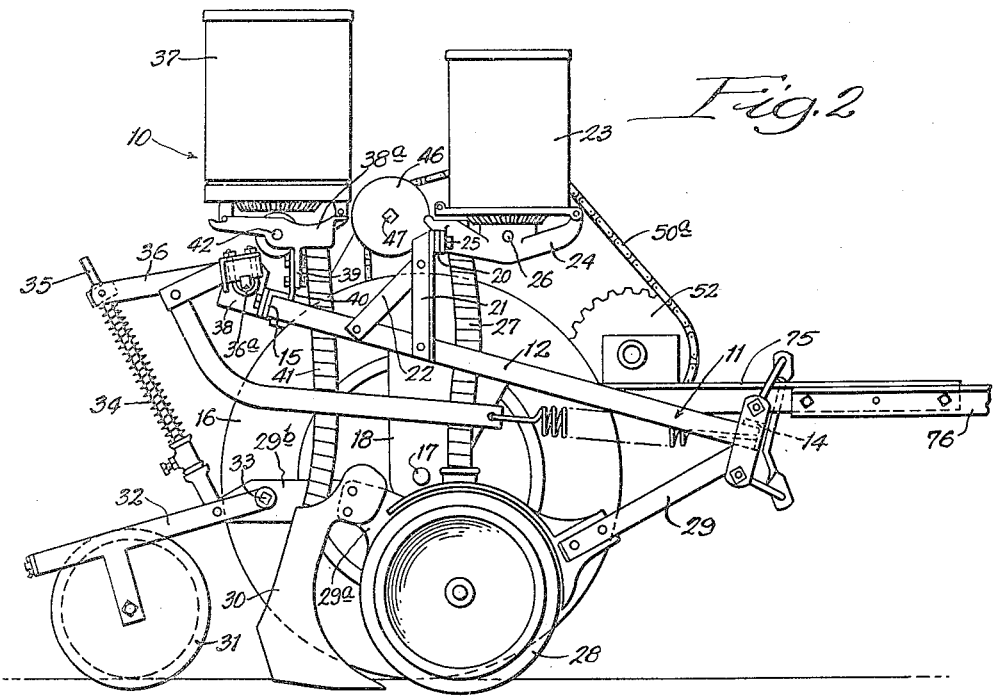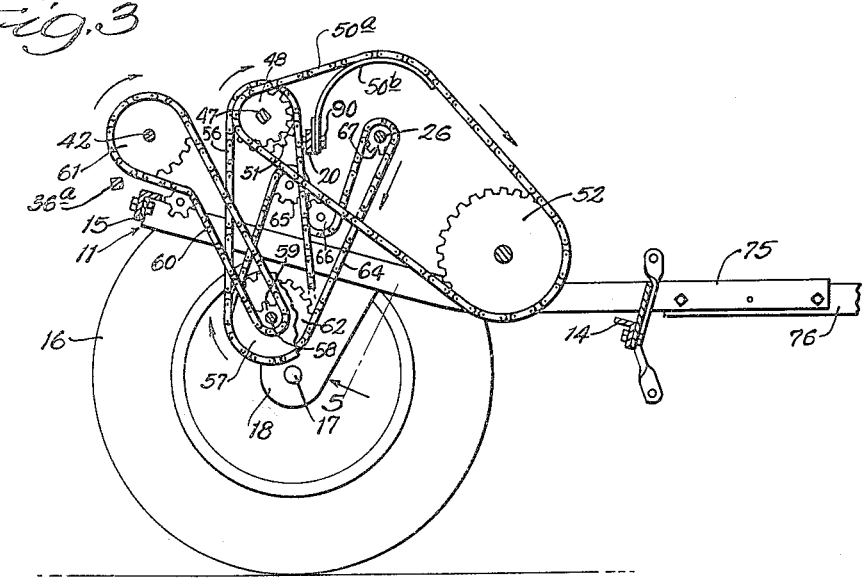

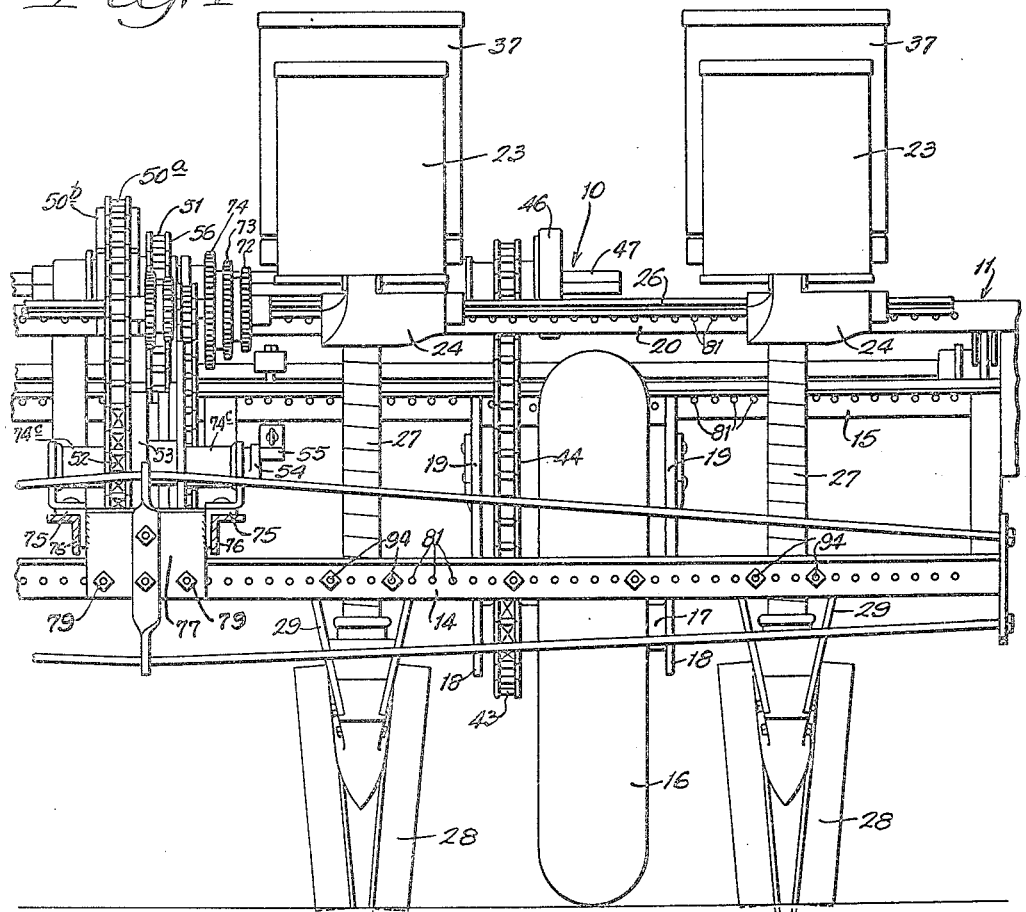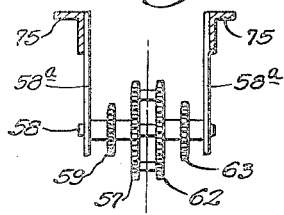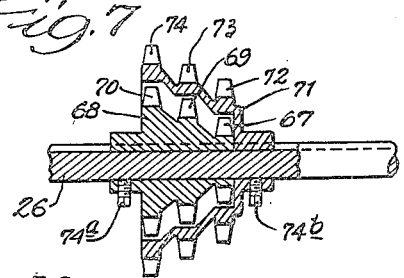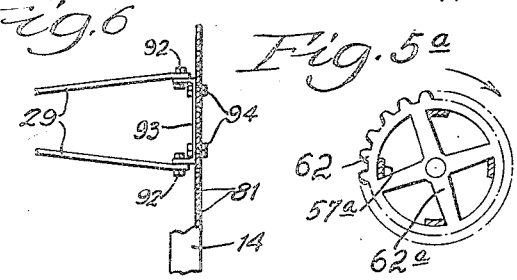

Jan. 30, 1945. C. C. HAAS 2,368,134
PLANTER
Filed March 31, 1943 5 Sheets-Sheet 5

Inventor:
Clarence C. Haas.
By Paul O. Pippel
Attorney.

Patented Jan. 30, 1945

2,368,134

UNITED STATES PATENT OFFICE 2,368,134

PLANTER

Clarence C. Haas, Richmond, Ind., assignor to International Harvester Company, a corporation of New Jersey Application March 31, 1943, Serial No. 481,208

17 Claims. (Cl. 111—59)

This invention relates to an implement construction such as a planter. More specifically, it relates to a frame construction and to an arrangement of driving mechanisms for an implement such as a planter.

Implements, such as planters, are known that comprise wheel-supported frames and planting and fertilizing units mounted thereon. If two such planters are run in side-by-side relationship for the sake of increasing the over-all width of planting, the frame construction of each planter may be complicated because the wheels should be within the frame and the planting and fertilizing elements, and the draft means should be laterally adjustable. The present application has to do with a frame construction that will permit the above and also have a special driving arrangement for power lift, planting elements, and fertilizer elements.

An object of the present invention is to provide an improved implement construction.

A further object is the provision of an improved planter.

Another object is to provide improvements in a frame construction.

Still another object is the provision of an improved frame construction involving a wheel-supported frame with carrying wheels inside.

A still further object is to provide an improved implement frame that is adapted to be drawn alongside a similar implement frame.

Another object is the provision of an improved planter provided with planting elements adjustable with respect to one another, thereby to enable the planter to be drawn alongside a similar planter.

Still another object is to provide an improved arrangement of driving mechanism on a planter of a power lift, fertilizer distributors, and planting elements.

Other objects will appear from the disclosure.

According to the present application, a frame for a planter has supporting wheels mounted inside and carries a transverse member spaced above the frame upon which planting elements are mounted. Fertilizer distributors are carried at the rear of the frame. The planting elements, the fertilizer distributors, wheel-mounting means, and a central draft means are adjustable transversely of the frame with respect to one another and with respect to the frame so that the planter is adapted to row spacings of various widths and adapted to be drawn alongside a similar planter.

In the drawings:

Figure 1 is a plan view of the improved planter of the present invention;

Figure 2 is a side view of the planter;

Figure 3 is a sectional view taken on the line 3 of Figure 1;

Figure 4 is a front view of the planter, partially in section, taken on the line 4 of Figure 1;

Figure 5 is a detail view taken on the line 5 of Figure 3 and showing a portion of the driving means of the planter;

Figure 5a is a section taken along the line 5a of Figure 5.

Figure 6 is a detail view, partially in section, of the pivotal mounting of the furrow opener;

Figure 7 is a sectional view showing a pair of nested sprockets forming part of the driving means;

Figure 8 is a plan view of a pair of planters connected so as to be drawn alongside one another;

Figure 9 is a side view showing a portion of the hitch for the planters of Figure 8;

Figure 11:
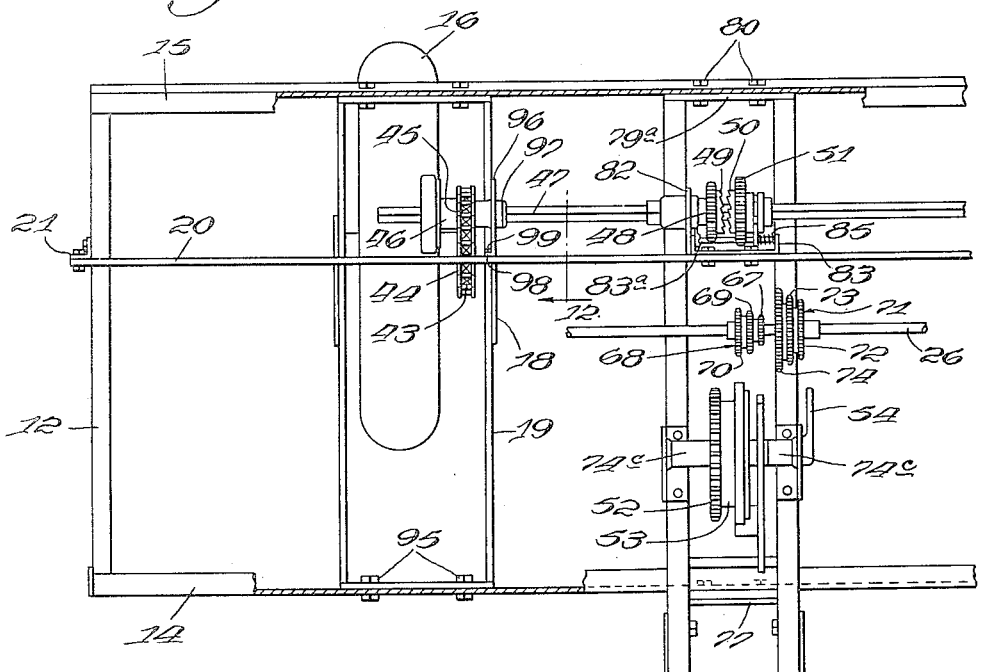
Figure 11 is a plan view of a portion of the planter with certain parts omitted.
Figure 10:
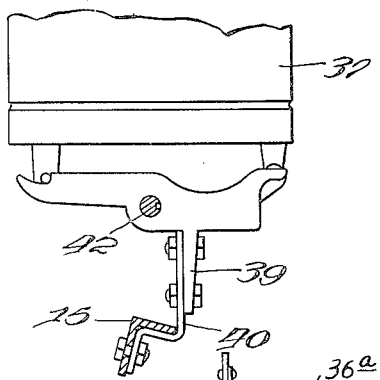
Figure 10 is a sectional view of a detail of a mounting.
Figure 13:
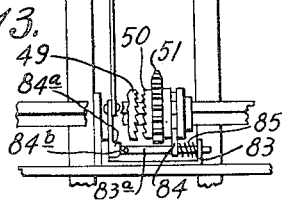
Figure 13 is a detail.

Reference character 10 is used to designate generally the planter shown in Figure 1. This planter includes a framework 11 composed of short longitudinal angle members 12 and 13, a long front transverse angle member 14, and a long rear transverse angle member 15. Positioned within the frame 11 is a pair of supporting wheels 16 upon which the frame 11 is mounted by means of axles 17, brackets 18, and rectangular parts 19. The brackets 18 depend from the rectangular parts 19 and carry the axles 17. The rectangular parts 19 are secured to the front and rear transverse angle members 14, 15 in a manner which will be described later. As seen in Figure 2, the wheel 16 projects somewhat above the frame 11, but the axes of the wheels are considerably below the frame. There is provided a transverse beam 20 positioned between the front and rear transverse angle members 14 and 15 and spaced above the frame 11. The beam 20 is secured at its ends to uprights 21 in the form of angle members which are in turn secured to the longitudinal angle members 12 of the frame 11 and braced by pieces 22. A plurality of planting units 23 are mounted upon the transverse beam 20 by means of base members 24 and bolts 25 securing the base members 24 to the transverse beam 20.

From the foregoing, it will be seen that although the frame 11 is positioned so that the wheels 16 project somewhat above the frame, the planting units 23 are positioned above the wheels 12, since they are carried upon the transverse beam 20, which is spaced above the frame 11 and is above the wheels 16. This permits a common driving shaft 26 for all the planting units 23 to be above and clear of the wheels 16, as shown in Figures 1 and 2. The common driving shaft 26 extends through the base parts 24 on the planting elements 23, as shown in Figure 2. The driving connection between the shaft 26 and the planting units 23 is not shown, since it is per se old and forms no part of the present invention. As seen in Figure 2, there depends from each planting unit 23 a flexible seed tube 27 leading to a furrow opener 28 carried upon a pair of supporting links 29 mounted upon the front transverse frame member 14. The furrow opener 28 is mounted upon a casting 29$^a$, which extends rearwardly and supports a fertilizer boot 30. An extension piece 29$^b$ is secured to the casting 29$^a$ and extends rearwardly therefrom. Positioned rearwardly of the fertilizer boot 30 is a covering wheel 31 mounted upon a member 32 pivoted at 33 on the extension piece 29$^b$. A spring 34 mounted upon a rod 35 acts against the member 32 to press the covering wheel 31 against the ground. The upper end of the spring 34 acts against a member 36 secured to a rock-shaft 36$^a$ mounted in bearings 38 secured to the rear transverse angle member 15. A plurality of fertilizer distributors 37 is carried by the rear transverse angle member 15. Each fertilizer distributor 37 has a base part 38$^a$ provided with a depending flange 39 secured to a bent member 40 secured in turn to the rear transverse angle member 15. A fertilizer tube 41 extends from each fertilizer distributor 37 to the fertilizer boot 30. The fertilizer distributors 37 are driven by a common shaft 42, which extends transversely of the frame and through the base parts 38$^a$, as shown in Figures 1 and 2. Figure 2 shows the furrow openers 28, the fertilizer shoes 30, and the covering wheels 31 in ground-engaging position. When these parts are to be lifted from ground engagement, the rock-shaft 36$^a$ is turned by a power-lift device to be described later and raises the parts.

Upon each axle 17 there is mounted a sprocket 43. The sprockets 43 are engaged by sprocket chains 44 which in turn engage sprockets 45 connected to over-running clutches 46 mounted upon a transverse shaft 47. The shaft 47 extends transversely of the frame 11 above and between the supporting wheels 16. Secured upon the shaft 47 is a sprocket 48 having a clutch portion 49 adapted to mesh with a clutch portion 50 of a sprocket 51. As seen in Figures 1 and 3, the sprocket 48 is engaged by a chain 50$^a$ extending over a guard 50$^b$ to a sprocket 52, which it engages. The sprocket 52 is secured to a portion of a power-lift clutch 53, which is not shown in detail since it forms no part of the present invention. It is sufficient to state that a crank arm 54 extends from the power-lift clutch 53 and is connected to an adjustable member 55 connected in turn with the rock-shaft 36$^a$. When the power lift 53, driven by the chain 50$^a$ through the sprocket 52, is caused to operate to rotate the crank 54, the resultant motion transmitted to the link 55 and by the link to the rock-shaft 36$^a$ causes an angular movement of the rock-shaft 36$^a$ that lifts the furrow openers 28, the fertilizer shoes 30 and the covering wheels 31 out of ground engagement. As seen in Figure 3, the sprocket 51 is engaged by a sprocket chain 56 which extends downwardly and engages a sprocket 57 mounted upon a shaft 58. The shaft 58 is supported in bearing brackets 58$^a$ depending from centrally located draft members 75 to be described later. The shaft 58 is below the framework, as is clear from Figure 3. As seen in Figure 5, a sprocket 59 is integrally secured to the sprocket 57 and, as shown in Figure 3, is engaged by a sprocket chain 60 that in turn engages a sprocket 61 driving the fertilizer shaft 42. As seen in Figure 5, the sprocket 57 is loosely connected with a sprocket 62 in such a manner as to drive the sprocket 62 and yet to have movement with respect thereto along the shaft 58. Thus sprocket 57 is provided with projections 57$^a$ which engage spokes 62$^a$ of the sprocket 62. Integrally secured to the sprocket 62 is a sprocket 63. As seen in Figure 3, the sprocket 62 is engaged by a sprocket chain 64 which in turn engages idler sprockets 65 and 66 and a small sprocket section 67 on a compound sprocket 68, splined upon the seed or planter shaft 26. As seen in Figure 7, the compound sprocket 68 also has an intermediate sprocket 69 and a large sprocket section 70. Figure 7 shows the compound sprocket 68 to be nested within a hollow compound sprocket 71 which has a small sprocket section 72, an intermediate sprocket section 73, and a large sprocket section 74. The compound sprockets are splined upon the planter shaft 26. With the sprocket chain 64 engaging the small sprocket section 67 of the compound sprocket 68 or the sprocket sections 69 and 70, the hollow compound sprocket 71 cannot be in the position shown in Figure 7 but must be moved to one side along the seed shaft 26, as shown in Figure 1. By engaging the sprocket chain 64 with any of the sprocket sections of the compound sprockets 68 and 71, six different speeds of the seed shaft 26 may be obtained for a certain speed of the sprocket 62. Likewise, six more speeds of the seed shaft 26 may be obtained with respect to the sprocket 63 integrally secured to the sprocket 62 by causing the sprocket chain 64 to mesh with the sprocket 63. In this case, the sprocket 62 is moved as near as possible to the sprocket 57. Thus 12 speeds of the seed shaft 26 may be had for a certain speed of the drive shaft 47. The fertilizer shaft 42 has no change of speed with respect to the drive shaft 47. Compound sprockets 68 and 71 are secured against axial movement on the seed shaft 26 by set screws 74$^a$ and 74$^b$.

The sprocket 52 of the power lift 53 is driven directly from the shaft 47 through the sprocket 48 and the sprocket chain 50$^a$. The seed shaft 26 and the fertilizer shaft 42 are both above the frame 11, as is the drive shaft 47, and are driven through sprockets 57, 59, 62, and 63 positioned below the frame 11 upon the shaft 58. Twelve speeds of the seed shaft 26 are obtained through the sprockets 62 and 63, integrally secured to one another, and through the compound sprockets 68 and 71, one of which nests within the other. Drive from the drive shaft 47 to the seed shaft 26 and the fertilizer shaft 42 must pass through the clutching portions 49 and 50 of the sprockets 48 and 51. The sprocket 51, carrying the clutching portion 50, is connected with the rock shaft 36ª so that when the power lift 53 causes the rock-shaft 36ª to rotate to lift the furrow openers 28, the fertilizer shoes 30, and the covering wheels 31 out of ground engagement, the sprocket 51 is shifted axially of the shaft 47 away from the sprocket 48 to disengage the clutching portions 49 and 50 and thereby to stop drive of the said shaft 26 and the fertilizer shaft 42.

The power lift 53 is supported by means of bearings 74ᶜ upon centrally located draft members 75, which are secured to the front and rear transverse angle members 14 and 15 and extend forwardly thereof. Members 76 are secured to the draft members 75 and serve to extend the effective length thereof in front of the frame 11. As seen in Figures 4 and 11, a plate 77 is secured to and between a forward portion of the draft members 75, and a piece 79ª is secured to and between the rear end of draft members 75. The plate 77 is secured by bolts 79 to the front transverse angle member 14, and the piece 79ª, to the rear transverse angle member 15 by bolts 80. As seen in Figure 4, the front and rear transverse angle members 14 and 15 and the transverse beam 20 each carry a plurality of closely spaced bolt holes 81 along the length thereof. These serve for the transverse adjustment of various parts mounted upon the frame 11 in a manner now to be described. For example, the draft members 75 are adjustable transversely of the frame by removal of the bolts 79 from the plate 77 and the front transverse frame member 14 and bolts 80 from the piece 79ª and the rear transverse frame member 15, transverse shifting of draft members 75, plate 77, and piece 79ª, and securement of the plate 77 and the piece 79ª to the frames 14 and 15, respectively, at a new position with the bolts 79 and 80 in different sets of holes 81 in frame members 14 and 15. The sprocket 48 is carried on a plate 82 secured to and extending upwardly from one draft member 75. Thus, transverse shifting of the draft members 75 causes a similar shifting of the plate 82 and sprocket 48. A shallow U-shaped part 83 is secured to the plate 82 and carries a rod 83ª on which are mounted a part 84 and a spring 85. Part 84 under influence of spring 85 keeps sprocket 51 against sprocket 48 to keep clutching portions 49 and 50 in engagement and yet permits disengagement of the clutching portions upon operation of the power-lift device 53. This is accomplished by a cam 84ª loose on rod 83ª and in engagement with a pin 84ᵇ projecting from the rod 83ª. Cam 84ª is rocked in response to rocking of shaft 36ª and is operatively connected thereto by a link 84ᶜ. Rotation of cam 84ª causes axial movement of rod 83ª and engagement or disengagement of clutch portions 49 and 50. When the plate 82 is shifted transversely with the draft members 75, the U-shaped part is also shifted. This causes shifting of the sprocket 51. Thus, shifting of the draft members 75 brings about a shifting of the entire assembly comprising sprockets 48 and 51 on drive shaft 47. As shown in Figure 1, a strap 86 is secured to one draft member 75 and receives a bearing 87 secured to it. Journaled within the bearing 87 is a sleeve, not shown, formed as an extension of the sprocket 61 driving fertilizer shaft 42. Set screws, not shown, prevent axial movement of the sprocket 61 and the bearing 87. When the draft members 75 are to be shifted transversely, the set screws are loosened, and the strap 86 moves the bearing 87 transversely. Then the sprocket 61 is shifted. Compound sprockets 68 and 71 are shifted along the seed shaft 26 as required upon loosening of the set screws 74ª and 74ᵇ. The guard 50ᵇ, supporting chain 50ª driving the power-lift device 53, is secured to the transverse beam 20 by bolts 90. When the draft members 75 are shifted, the bolts 90 are removed, the guard 50ᵇ shifted, and the bolts 90 secured in different openings 81 in the beam 20. Bolts 91 secure the transverse beam 20 to the U-shaped member 83 so as to cause the beam 20 to be supported at a mid-point. Shifting of the draft members 75 causes shifting of the counter-sprockets 57, 59, 62, and 63 shown in Figure 5, since they are supported on shaft 58 carried by brackets 58ª depending from draft members 75.

As shown in Figure 6, the supporting links 29 for the furrow openers 28 are pivoted by bolts 92 on U-shaped brackets 93, secured by bolts 94 extending through openings 81 in the front transverse angle member 14. When the furrow openers 28 are to be shifted, the bolts 94 are removed, the brackets 93 shifted, and the brackets again secured with the bolts 94 in a different set of openings 81. The planting units 23 are shifted by removal of the bolts 25 from a certain set of openings 81 in the transverse beam 20 and insertion in different openings in the beam 20. In the same way, the fertilized distributors 37 are shifted transversely of the frame 11 by removal of bolts securing the bent members 40 to the rear transverse angle member 15 from one set of openings 81 therein and insertion of the bolts into a different set of openings.

Figure 12:
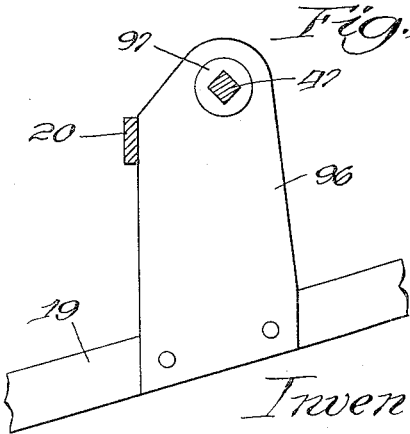
Figure 12 is a sectional view taken on the line 12 of Figure 11.

As seen in Figure 11, the rectangular part 19, upon which a wheel 16 and its axle 17 are mounted by brackets 17, is secured to the transverse angle members 14 and 15 by bolts 95 extending through openings 81 in the members 14 and 15. When the wheel 16 is to be shifted transversely of the framework 11, bolts 95 are removed, the rectangular part 19 shifted, and the bolts 95 secured in a new set of openings 81. As shown in Figures 11 and 12, a plate 96 is secured to one side of the rectangular part 19 and extends upwardly therefrom and carries at its upper end a bearing 97 supporting the slip clutch 46, the sprocket 45, and the drive shaft 47. The plate 96 is connected with the bearing 97 so that shifting of the plate 96 resulting from shifting of the wheel 16 and the rectangular part 19 brings about shifting of the bearing 97. The bearing 97 and the assembly of slip clutch 46 and sprocket 45 are held together by means, not shown, so that they are shifted jointly. Thus, shifting of the wheel 16 brings about shifting of an entire unit of which the wheel is a part, namely, the rectangular part 19, the plate 96, the bearing 97, the slip clutch 46, and the sprocket 45. The plate 96 has a flange 98 to which the transverse beam 20 is secured by a bolt 99 and is thereby provided with support. When shifting of the unit previously referred to takes place, the bolt 101 must be removed and refastened in a different opening 81 in the transverse beam 20.

To summarize, there may be transverse shifting with respect to the frame 11 of supporting wheels 16, central draft member 75 and parts carried thereby, planting units 23, and fertilizer distributors 37. The planting units 23 and the fertilizer distributor units 37 may be shifted to accommodate the planter to different row spacings. The other parts may be shifted along with the fertilizer distributors and the planting units to accommodate the planter to being used in parallel with another similar planter, as shown in Figure 8. As seen in this figure, two planter units 10 are drawn side-by-side, and they are connected to a common transverse hitch bar 102 supported upon caster wheels 103, as indicated in Figure 9. They are connected to the transverse hitch bar by members 104 secured to the central draft members 75 and by extensible connections 105 which connect inner ends of the planters 10 and a central part of the transverse hitch bar 102. Longitudinal hitch members 106 extend forwardly to a source of draft, not shown, for the planters, which source may be a tractor. As will be seen in Figure 8, the planting units 23 and fertilizer distributors 37 have been shifted toward their inner ends so that the spacing between the planting units and fertilizer distributors of each planter 10 may be maintained between the planter units 23 and fertilizer distributors 37 at the inner ends of the planter 10. The hitch members 75 have been shifted transversely with respect to the frames 11, and, similarly, the supporting wheels 16 have been shifted. From the foregoing, it will be seen that the provision of shiftability of the various parts of the planter transversely with respect to the supporting framework adapts the parts for individual adjustment with respect to one another for a change in row spacing, and also adapts the planter to be drawn alongside a similar planter with maintenance of row spacing throughout the combined width of the planters.

It has been known to provide a planter with transversely adjustable planting and fertilizer units for the purpose of adapting the planter to different row spacings. It is believed to be new to provide such transverse adjustments for adapting the planter to be pulled side-by-side or in tandem relation with another similar planter. In this case the transverse adjustment of the wheels within the planter framework and the transverse adjustment of the draft members are of special advantage. Of particular significance as concerns the adjustment of the draft members and the supporting wheels is the fact that there is adjustment of a plurality of parts associated as a unit. One unit comprises the draft members 75 joined to one another by plates 77 and piece 79ª, the power-lift device 53, sprockets 48 and 51 on drive shaft 47, countersprockets 57, 59, 62, and 63, and sprocket 61 on fertilizer shaft 47. This is possible, because all these parts are interconnected. Similarly, the adjustment of each wheel 16 brings about adjustment of parts associated therewith such as the rectangular part 19, the sprocket 45 driven by the wheel 16 and driving the drive shaft 47, and slip clutch 46 connecting the sprocket 45 and the drive shaft 47. Thus, there is adjustment with the wheel 16 of the parts that connect the wheel with the drive shaft 47.

It will be seen from the foregoing description that a new and novel implement construction has been provided. One feature of novelty is the provision for transverse adjustment of the various parts with respect to the supporting framework just referred to. Another feature of novelty is the carrying of the planting units upon a transverse beam positioned above and in spaced relation to the framework. This permits the wheels to project partially above the framework and yet be within the framework. Another feature of novelty is the arrangement of drive mechanism by which a drive shaft positioned above the framework transmits drive to parts below the framework which in turn transmit drive to fertilizer and seed shafts above the framework. The power lift is driven directly from the shaft above the framework.

The intention is to limit the invention only within the scope of the appended claims.

What is claimed is:

1. A planter comprising a mobile framework, supporting wheels positioned within the framework with their axes transverse to the direction of movement of the framework, means mounting the framework on the wheels for transverse adjustment of the wheels with respect to one another and with respect to the framework, a plurality of planting units, means mounting the planting units on the framework, a draft means, means adjustably securing the draft means to the framework for transverse adjustment with respect thereto, the various transverse adjustments specified serving to adapt the planter to be coupled in side-by-side abutting relation with another similar planter.

2. A planter comprising a mobile framework, a plurality of planting units, means mounting the planting units on the framework for transverse adjustment with respect to one another and with respect to the framework, a draft means, means adjustably securing the draft means to the framework for transverse adjustment with respect thereto, the various transverse adjustments specified serving to adapt the planter to be coupled in side-by-side abutting relation with another similar planter.

3. A planter comprising a mobile framework, supporting wheels positioned within the framework with their axes transverse to the direction of movement of the framework, means mounting the framework on the wheels for transverse adjustment of the wheels with respect to one another and with respect to the framework, a plurality of planting units, means mounting the planting units on the framework for transverse adjustment with respect to one another and with respect to the framework, a draft means, means adjustably securing the draft means to the framework for transverse adjustment with respect thereto, the various transverse adjustments specified serving to adapt the planter to be coupled in side-by-side abutting relation with another similar planter.

4. A planter comprising a mobile framework, formed of short side members extending longitudinally of the direction of movement of the framework and of long front and rear members extending transversely of the direction of movement, supporting wheels positioned within the framework with their axes transverse to the direction of movement, supports secured to the transverse members and connected with the wheels for mounting the framework on the wheels, a long transverse beam spaced from and above the frame between the transverse members, means securing the transverse beam to the side members, planting units mounted on the transverse beam, and fertilizer units mounted on the rear transverse member.

5. In combination, a mobile framework, wheels supporting the framework, planting units mounted on the framework, a planter shaft for driving the planter units positioned above the framework, fertilizer units mounted on the framework, a fertilizer shaft for driving the fertilizer units positioned above the framework, a drive shaft positioned above the framework, means connecting the supporting wheels and the drive shaft for driving the drive shaft, rotatable means positioned below the framework, means connecting the drive shaft and the rotatable means for transmitting drive to the rotatable means, means connecting the rotatable means and the planting shaft for transmitting drive to the planting shaft, and means connecting the rotatable means and the fertilizer shaft for transmitting drive to the fertilizer shaft.

6. In combination, a mobile framework, wheels supporting the framework, planting units mounted on the framework, a planter shaft for driving the planter units positioned above the framework, fertilizer units mounted on the framework, ground-engaging means for depositing upon the ground seed and fertilizer received from the planting and fertilizer units, a power-lift device positioned upon the framework, means connecting the power-lift device and the ground-engaging means for raising the ground-engaging means, a fertilizer shaft for driving the fertilizer units positioned above the framework, a drive shaft positioned above the framework, means connecting the supporting wheels and the drive shaft for driving the drive shaft, rotatable means positioned below the framework, means connecting the drive shaft and the rotatable means for transmitting drive to the rotatable means, means connecting the rotatable means and the planting shaft for transmitting drive to the planting shaft, means connecting the rotatable means and the fertilizer shaft for transmitting drive to the fertilizer shaft, and means connecting the drive shaft and the power-lift device independently of the rotatable means for operating the power-lift device.

7. In combination, a mobile framework having transverse members and longitudinal members, planting units mounted on the framework, a transverse shaft mounted in spaced relation above the framework, and a unit connected to the framework for transverse adjustment with respect to the framework and comprising a supporting wheel, a rectangular wheel-mounting member surrounding the wheel and secured to the transverse members for transverse adjustment with respect to the framework, a bracket secured to and extending upwardly from the wheel-mounting member to the shaft, shaft-driving means axially slidable on the shaft and connected with the bracket so as to be adjustable transverse of the framework along with the bracket and wheel-mounting member, and means connecting the supporting wheel and the shaft-driving means for driving the latter.

8. In combination, a mobile framework having long transverse members and short longitudinal members, planting units mounted on the framework, a transverse shaft mounted in spaced relation above the framework, a unit connected to the framework for transverse adjustment with respect thereto and comprising a supporting wheel, a first sprocket secured thereto, a rectangular wheel-mounting member surrounding the wheel and the first sprocket and secured to the transverse members for transverse adjustment with respect to the framework, a bracket secured to and extending upwardly from the wheel-mounting member to the shaft, shaft-driving means axially slidable on the shaft and connected with the bracket so as to be adjustable along the shaft along with the bracket and wheel-mounting member, the shaft-driving means including a second sprocket, and a sprocket chain connecting the sprockets.

9. In combination, a mobile framework, a plurality of planting units mounted thereon, a shaft mounted on the framework, and a unit adjustable with respect to the direction in which the shaft extends and comprising a supporting wheel positioned below the shaft, a wheel-mounting member secured to the framework for adjustment with respect to the framework in the said direction, a bracket secured to the wheel-mounting member and extending to the shaft, shaft-driving means axially slidable on the shaft and connected with the bracket so as to be adjustable along with the bracket and the wheel-mounting member.

10. In combination, a mobile framework, a shaft mounted thereon, and a unit connected to the framework for adjustment in the direction in which the shaft extends and comprising a supporting wheel below the shaft, a wheel-mounting means connected to the framework for adjustment in the said direction, shaft-driving means slidable along the shaft and connected with the wheel-mounting means for adjustment along with the wheel-mounting means, and means connecting the supporting wheel and the shaft-driving means for driving the shaft from the supporting wheel.

11. In combination, a mobile framework comprising longitudinal members and transverse members, supporting wheels for the framework, a transverse drive shaft mounted on the framework and connected with the supporting wheels so as to be driven thereby, a plurality of planting units mounted on the framework, a transverse planting shaft for the planting units mounted on the framework, and a unit connected to the framework for transverse adjustment with respect to the framework and comprising a pair of longitudinal draft members, parts securing the draft members together and connecting them to the transverse members for adjustment with respect thereto, a bracket secured to one draft member and extending to the transverse drive shaft, planting-shaft-driving means axially slidable on the drive shaft and connected with the bracket so as to be transversely adjustable along with the bracket and the draft members, and means connecting the planting-shaft-driving means and the planting shaft for driving the planting shaft from the transverse drive shaft.

12. In combination, a mobile framework comprising longitudinal members and transverse members, supporting wheels for the framework, a transverse drive shaft mounted on the framework and connected with the supporting wheels so as to be driven thereby, a plurality of fertilizer units mounted on the framework, a transverse fertilizer shaft for the fertilizer units mounted on the framework, and a unit connected to the framework for transverse adjustment with respect to the framework and comprising a pair of longitudinal draft members, parts securing the draft members together and connecting them to the transverse members for adjustment with respect thereto, a bracket secured to one draft member and extending to the transverse drive shaft, fertilizer-shaft-driving means axially slidable on the drive shaft and connected with the bracket so as to be transversely adjustable along with the bracket and the draft members, and means connecting the fertilizer-shaft-driving means and the fertilizer shaft for driving the fertilizer shaft from the transverse shaft.

13. In combination, a mobile framework comprising longitudinal members and transverse members, supporting wheels for the framework, a transverse drive shaft mounted on the framework and connected with the supporting wheels so as to be driven thereby, a ground-engaging device mounted on the framework for movement between a raised position and a ground-engaging position, and a unit connected to the framework for transverse adjustment with respect to the framework and comprising a pair of longitudinal draft members, parts securing the draft members together and connecting them to the transverse members for adjustment with respect thereto, a power-lift device mounted on the draft members so as to be transversely adjustable along with the draft members, a bracket secured to one draft member and extending to the transverse drive shaft, driving means for the power-lift device slidable along the transverse drive shaft and connected with the bracket so as to be adjustable with respect to the framework along with the bracket, the draft members, and the power-lift device, and means connecting the power-lift device, slidable driving means on the transverse drive-shaft for operating the power-lift device from the transverse drive shaft.

14. In combination, a mobile framework comprising longitudinal members and transverse members, supporting wheels for the framework, a transverse drive shaft mounted on the framework and connected with the supporting wheels so as to be driven thereby, a plurality of planting units mounted on the framework, a transverse planting shaft for operating the planting units, a plurality of fertilizer units mounted on the framework, a transverse fertilizer shaft for operating the fertilizer units, ground-engaging devices liftably mounted on the framework and associated with the planting and fertilizer units, and a unit connected to the framework for transverse adjustment with respect thereto and comprising a pair of longitudinal draft members, parts securing the draft members together and connecting them to the transverse members for transverse adjustment with respect to the framework, a first bracket secured to one draft member, driving means axially slidable on the transverse drive shaft and connected with the first bracket so as to be transversely adjustable along with the first bracket and the draft members, a second bracket secured to one draft member, driving means axially slidable on the fertilizer shaft and connected with the second bracket so as to be transversely adjustable along with the second bracket and the draft members, a power-lift device mounted on the draft members so as to be transversely adjustable along with the draft members and connected with the ground-engaging means so as to lift the same, means connecting the driving means on the draft shaft and the planter shaft, means connecting the driving means on the drive shaft and the driving means on the fertilizer shaft, and means connecting the driving means on the drive shaft and the power-lift device.

15. In combination, a mobile framework, supporting wheels therefor, planting means mounted thereon, a transverse drive shaft mounted on the framework, and a unit connected with the framework for transverse adjustment with respect thereto and comprising draft means connected to the framework for transverse adjustment, a driving means slidable along the transverse drift shaft, means connecting the draft means and the driving means for causing the driving means to be adjusted transversely along with the draft means, and means connecting the driving means and the planting means for transmitting drive from the transverse drive shaft to the planting means.

16. In combination, a mobile framework, supporting wheels therefor, fertilizer-distributing means mounted on the framework, a transverse fertilizer shaft for operating the fertilizer-distributing means, a transverse drive shaft, and a unit connected with the framework for transverse adjustment with respect thereto and comprising draft means connected to the framework for transverse adjustment, driving means mounted on the transverse drive shaft for axial sliding therealong, means connecting the last-mentioned driving means and the draft means for causing the last-mentioned driving means to be adjusted transversely along with the draft means, driving means mounted on the fertilizer shaft for axial sliding therealong, means connecting the last-mentioned driving means and the draft means for causing the last-mentioned driving means to be adjusted transversely along with the draft means, and means connecting the driving means on the transverse drive shaft and the driving means on the fertilizer shaft for transmitting drive from the drive shaft to the fertilizer shaft.

17. In combination, a mobile framework, supporting wheels therefor, a liftable operating element mounted on the framework, a transverse drive shaft mounted on the framework, and a unit connected to the framework for transverse adjustment with respect thereto and comprising a draft means connected to the framework for transverse adjustment, a power-lift device connected with the operating element for lifting the same and mounted on the draft means so as to be transversely adjustable along with the draft means, driving means mounted on the transverse drive shaft for axial sliding therealong, means connecting the draft means and the driving means for causing the driving means to be adjusted transversely along with the draft means, and means connecting the driving means and the power-lift device for operating the power-lift device from the transverse drive shaft.

CLARENCE C. HAAS.